US009033597B1

(12) United States Patent
Chen et al.

(10) Patent No.: US 9,033,597 B1

(45) Date of Patent: May 19, 2015

(54) CAMERA LENS FRONT COVER AND THE MONITORING CAMERA HAVING THE SAME

(71) Applicant: DYNACOLOR INC., Taipei (TW)

(72) Inventors: Warren Chen, Taipei (TW); Han-Ting Ko, Taipei (TW); I-Mu Chou, Taipei (TW)

(73) Assignee: DYNACOLOR INC., Taipei (TW)

( * ) Notice: Subject to any disclaimer, the term of this patent is extended or adjusted under 35 U.S.C. 154(b) by 0 days.

(21) Appl. No.: 14/321,980

(22) Filed: Jul. 2, 2014

(51) Int. Cl.

| | |
|---|---|
| ***G03B 17/00*** | (2006.01) |
| ***H04N 5/225*** | (2006.01) |
| ***G08B 13/196*** | (2006.01) |

(52) U.S. Cl.

CPC ................................ *G08B 13/19619* (2013.01)

(58) Field of Classification Search

CPC ................................................ G08B 13/19619

USPC ........................................... 396/427; 348/373

See application file for complete search history.

(56) References Cited

U.S. PATENT DOCUMENTS

| | | | | |
|---|---|---|---|---|
| 6,783,286 | B2 * | 8/2004 | Maeda et al. | 396/427 |
| 2005/0270414 | A1 * | 12/2005 | Lee | 348/373 |
| 2007/0292121 | A1 * | 12/2007 | Sato | 396/144 |
| 2011/0013900 | A1 * | 1/2011 | Takahashi | 396/427 |
| 2014/0037282 | A1 * | 2/2014 | Chen | 396/427 |

* cited by examiner

*Primary Examiner* — W B Perkey

(74) *Attorney, Agent, or Firm* — WPAT, PC; Justin King

(57) ABSTRACT

A camera lens front cover and the monitoring camera having the same are disclosed. The monitoring camera may comprise a main body, a lens module and a camera lens front cover. The lens module may be disposed on the main body and comprise a lens holder and a camera lens, wherein the camera lens may protrude from the lens holder. The camera lens front cover may comprise a cylindrical casing and a glass cap, wherein the cylindrical casing may be hollow, and there are two openings at both sides of the cylindrical casing, and the lens module may be disposed inside the cylindrical casing. The glass cap may be disposed on one of the openings of the cylindrical casing and one side of the glass cap may be disposed with a protrusion part for accommodating the camera lens protruding from the lens holder.

12 Claims, 6 Drawing Sheets

CAMERA LENS FRONT COVER AND THE MONITORING CAMERA HAVING THE SAME

BACKGROUND OF THE INVENTION

1. Field of the Invention

The present invention generally relates to a camera lens front cover, in particular to a camera lens front cover capable of increasing the view angle of a monitoring camera. The present invention further discloses a monitoring camera having the camera lens front cover.

2. Description of the Related Art

With the rapid advance of the overall living standards, people's requirements to the quality of their daily life are becoming higher; however, the public security situation in society has taken a turn for the worse, so people pay more attention to the security of their homes and workplaces. People usually use security monitoring systems to monitor the surroundings of their homes and workplaces to enhance the security of these places for the purpose of protecting their lives and property. However, the conventional monitoring camera has a lot of shortcomings to be overcome.

Please refer to FIG. 1 and FIG. 2; FIG. 1 and FIG. 2 are the first schematic view and second schematic view of a conventional monitoring camera.

As shown in FIG. 1, the conventional monitoring camera 1 comprises a main body 10, a lens module 11 and a camera lens front cover 12. The lens module 11 is disposed on the main body 10, and comprises a lens holder 111 and a camera lens 112. The camera lens front cover 12 is composed of a cylindrical casing 121 and a glass cap 122, wherein the glass cap 122 further comprises a protrusion edge 1221, and the camera lens front cover 12 is disposed on the main body 10 and caps the lens module 11. As shown in FIG. 2, as the camera lens 112 is disposed inside the camera lens front cover 12 to capture the images in front of it, the view angle $\theta_1$ of the camera lens 112 will be influenced by the camera lens front cover 12. As shown in FIG. 2, the view angle $\theta_1$ of the camera lens 112 is blocked by the protrusion edge 1221 and other components of the camera lens front cover 12, which significantly limits the application range of the monitoring camera.

Therefore, it is the primary object of the present invention to provide a monitoring camera capable of effectively increasing the view angle of a monitoring camera to overcome the shortcomings of the conventional monitoring camera.

SUMMARY OF THE INVENTION

Therefore, it is a primary objective of the present invention to provide a camera lens front cover and the monitoring camera having the same to achieve the effect of widening the view angle of a monitoring camera.

To achieve the foregoing objective, the present invention provides a monitoring camera. The monitoring camera may comprise a main body, a lens module and a camera lens front cover. The lens module may be disposed on the main body, wherein the lens module may comprise a lens holder and a camera lens, and the camera lens may protrude from the lens holder. The camera lens front cover may comprise a cylindrical casing and a glass cap, wherein the cylindrical casing may be hollow and there are two openings at both sides of the cylindrical casing. The lens module may be disposed inside the cylindrical casing and the glass cap may be disposed on one of the openings of the cylindrical casing, wherein one side of the glass cap may be disposed with a protrusion part for accommodating the camera lens protruding from the lens holder.

To achieve the foregoing objective, the present invention further provides a camera lens front cover. The camera lens front cover may comprise a cylindrical casing and a glass cap. The cylindrical casing can accommodate a lens module composed of a lens holder and a camera lens, wherein the cylindrical casing may be hollow and there are two openings at both sides of the cylindrical casing. The glass cap may be disposed on one of the openings of the cylindrical casing, wherein one side of the glass cap may be disposed with a protrusion part for accommodating the camera lens protruding from the lens holder.

In a preferred embodiment of the present invention, the protrusion part may be circular, elliptical or polygonal.

In a preferred embodiment of the present invention, the protrusion part may be a spherical surface.

In a preferred embodiment, the cylindrical casing may be a hollow cylinder.

In a preferred embodiment, the glass cap may further comprise a protrusion edge disposed on the other side of the glass cap.

In a preferred embodiment, the monitoring camera may be a gun-shaped camera.

The monitoring camera and the camera lens front cover in accordance with the present invention have the following advantages:

(1) According to the present invention, the glass cap of the camera lens front cover comprises a protrusion part with spherical surface for accommodating the camera lens, thereby the camera can protrude from the lens holder and the view angle of the monitoring camera can be significantly widened.

(2) The camera lens front cover according to the present invention has special design, which can effectively widen the view angle of the monitoring camera without significantly changing the structure of the monitoring camera.

(3) The present invention can effectively widen the view angle of the monitoring camera, which makes the application of the monitoring camera more flexible.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
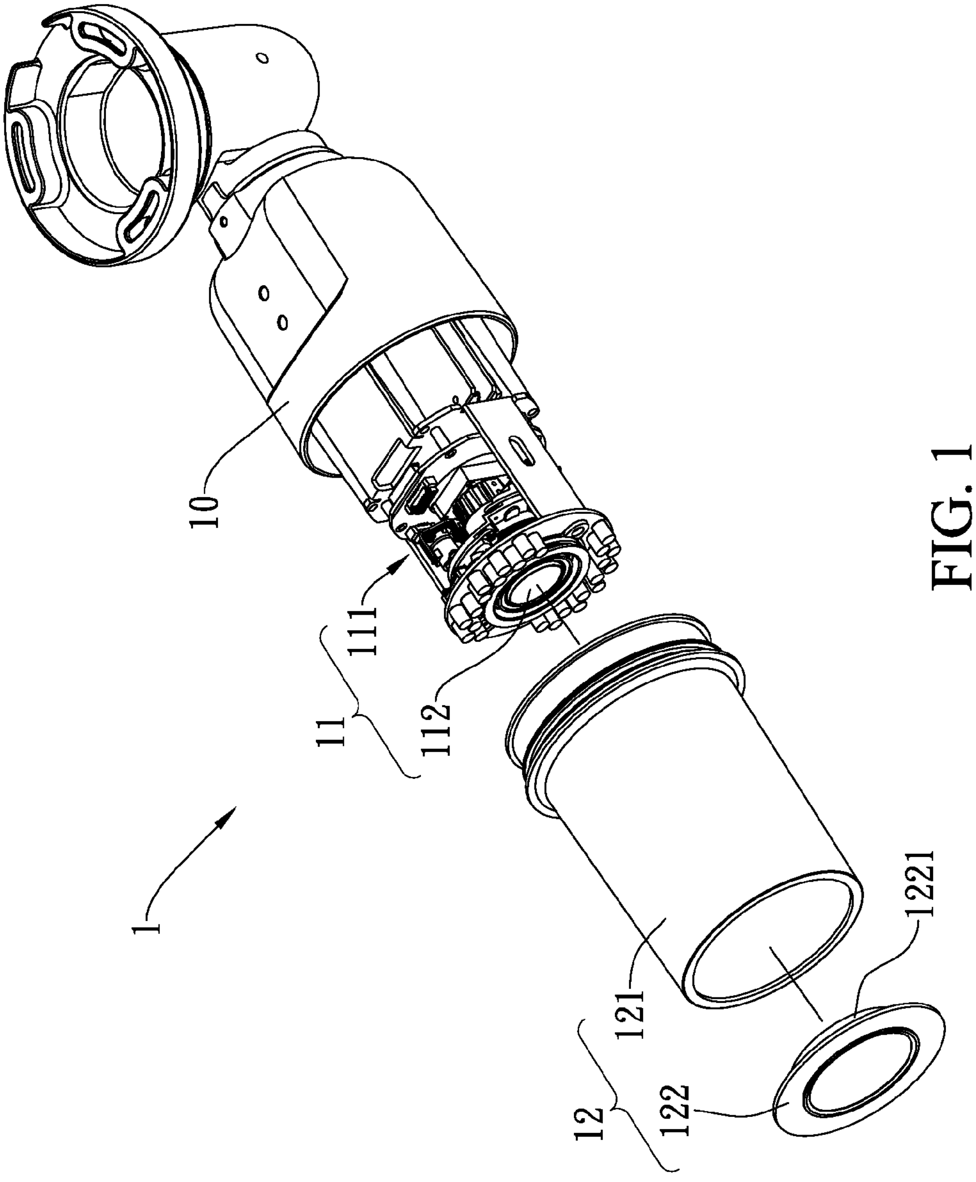
FIG. 1 is the first schematic view of a conventional monitoring camera.
Figure 2:
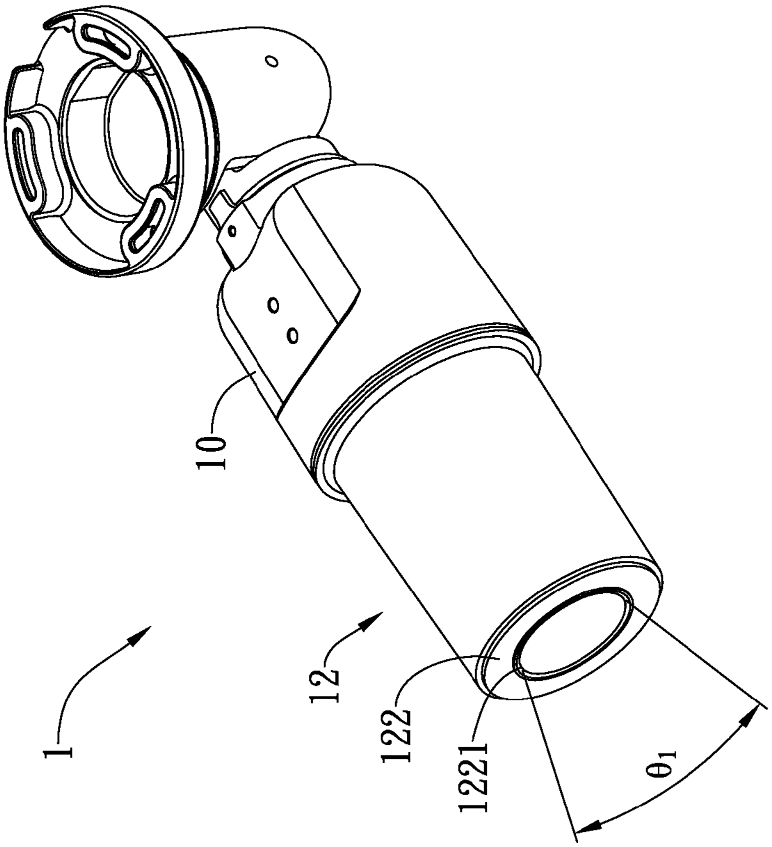
FIG. 2 is the second schematic view of a conventional monitoring camera.
Figure 3:
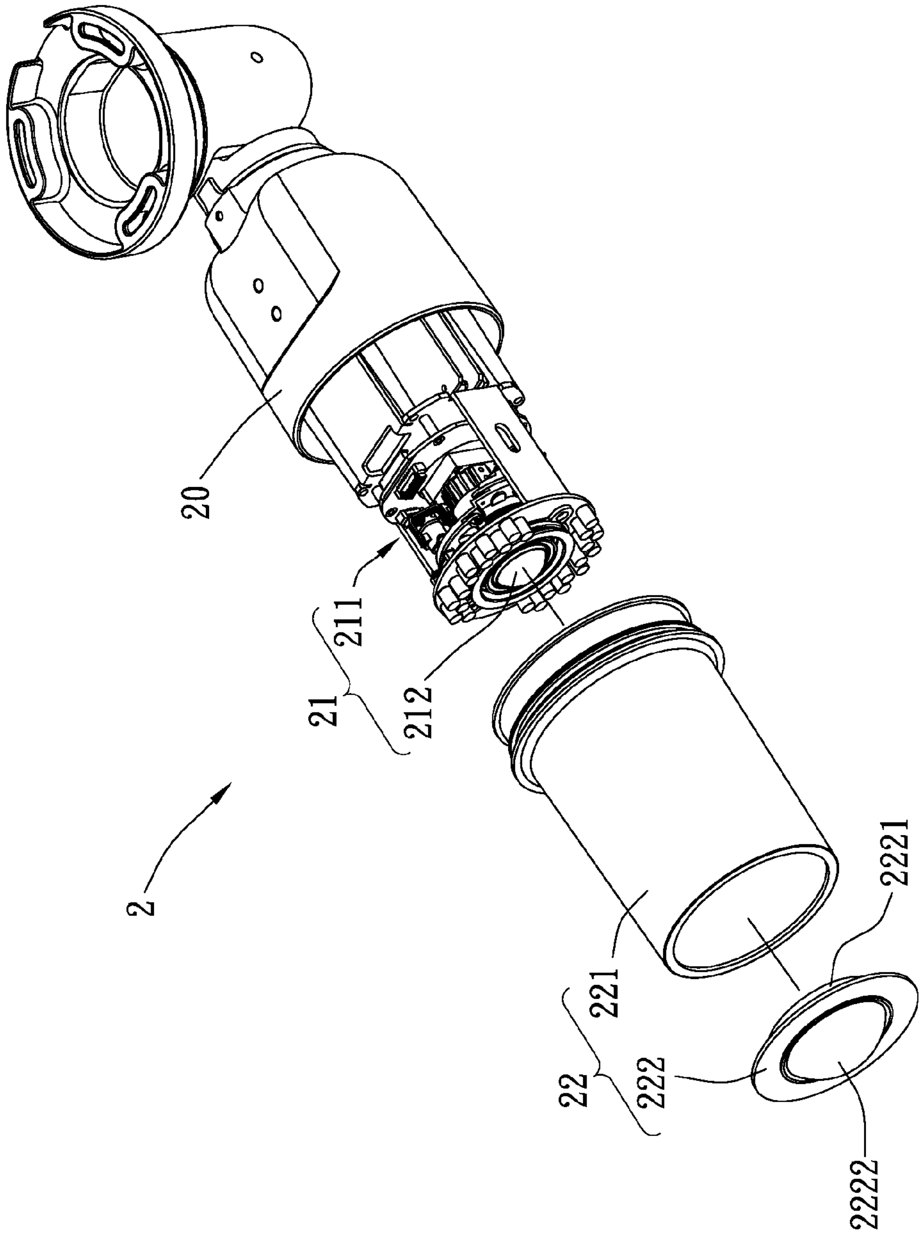
FIG. 3 is the first schematic view of the first embodiment of a monitoring camera in accordance with the present invention.

With reference to FIG. 3 for the first schematic view of the first embodiment of a monitoring camera in accordance with the present invention, the monitoring camera 2 comprises a main body 20, a lens module 21 and a camera lens front cover 22.

The lens module 21 is disposed on the main body 20, wherein the lens module 21 comprises a lens holder 211 and a camera lens 212. The camera lens 212 is disposed on the lens holder 211 and protrudes from the lens holder 211. The camera lens front cover 22 comprises a cylindrical casing 221 and a glass cap 222, wherein the cylindrical casing 221 is hollow and there are two openings at both sides of the cylindrical casing 221. The glass cap 222 is disposed on one of the opening of the cylindrical casing 221 and the space inside the glass cap 222 can be used to accommodate the lens module 21. In the embodiment, the cylindrical casing 221 is a hollow cylinder. One side of the glass cap 222 is disposed with a protrusion part 2222 and the other side of the glass cap 222 is disposed with a protrusion edge 2221, wherein the protrusion edge 2221 can be disposed at the position corresponding to the protrusion part 2222. The camera lens front cover 22 is disposed on the main body 20 and caps the lens module 21. The protrusion part 222 can accommodate the camera lens 212 protruding from the lens holder 211, such that the view angle of the camera lens 212 will not be blocked by the protrusion edge 2221 or other components of the glass cap 222.

In the embodiment, the protrusion part 222 can be a spherical surface. Of course, which is just an example instead of a limitation; the protrusion part 222 may be in various shapes, such as circular, elliptical or polygonal.

Figure 4:
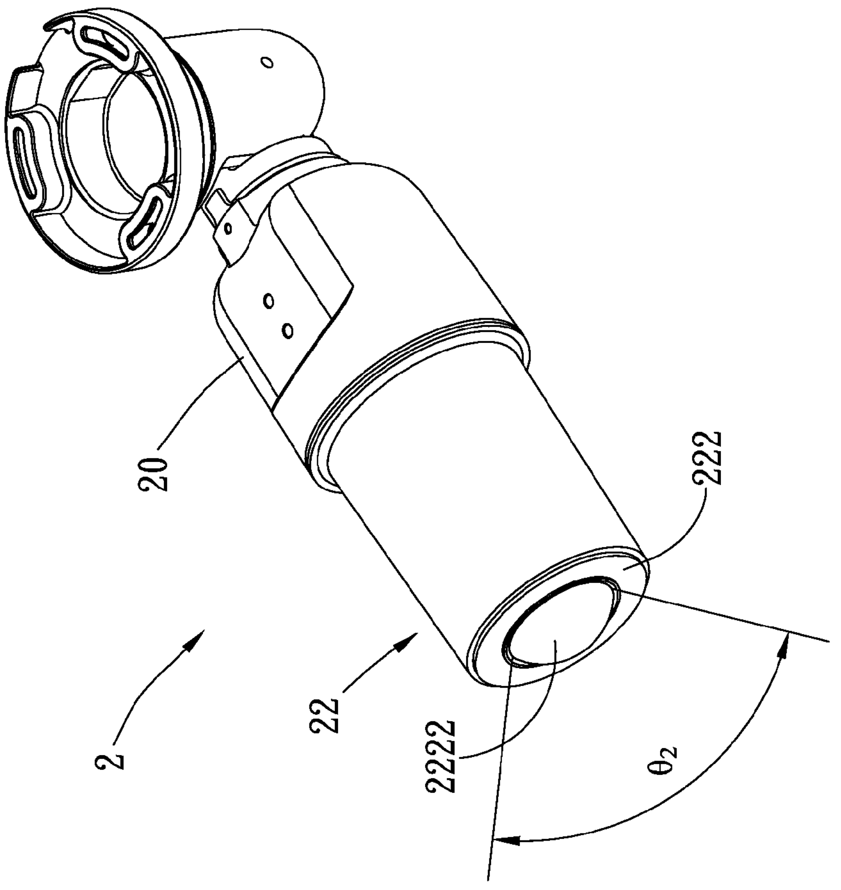
FIG. 4 is the second schematic view of the first embodiment of a monitoring camera in accordance with the present invention.

Please refer to FIG. 4. FIG. 4 is the second schematic view of the first embodiment of a monitoring camera in accordance with the present invention.

As shown in FIG. 4, the camera lens 212 protrudes from the lens holder 211 and the part protruding from the lens holder 211 can be accommodated by the spherical protrusion part 2222. In this way, the protrusion edge 2221 of the camera lens front cover 22 or other components will not block the field of view in front of the camera lens 212; therefore, the view angle $\theta_2$ can be wider than before and the application of the monitoring camera 2 can be more flexible.

It is worthy to note that the glass cap of the conventional monitoring camera will significantly limit its view angle, which will also limit the application of the monitoring camera.

On the contrary, the present invention provides a novel design, which slightly changes the structure of the camera lens front cover of the monitoring camera to add a protrusion part on the camera lens front cover for accommodating the camera lens protruding from the lens holder, which does not have to significantly change the original structure of the monitoring camera. Accordingly, the present invention can effectively widen the view angle of the monitoring camera, but will not induce additional cost, which can make the application of the monitoring camera more flexible. Thus, the present invention can really improve the shortcomings of the prior art.

Figure 5:
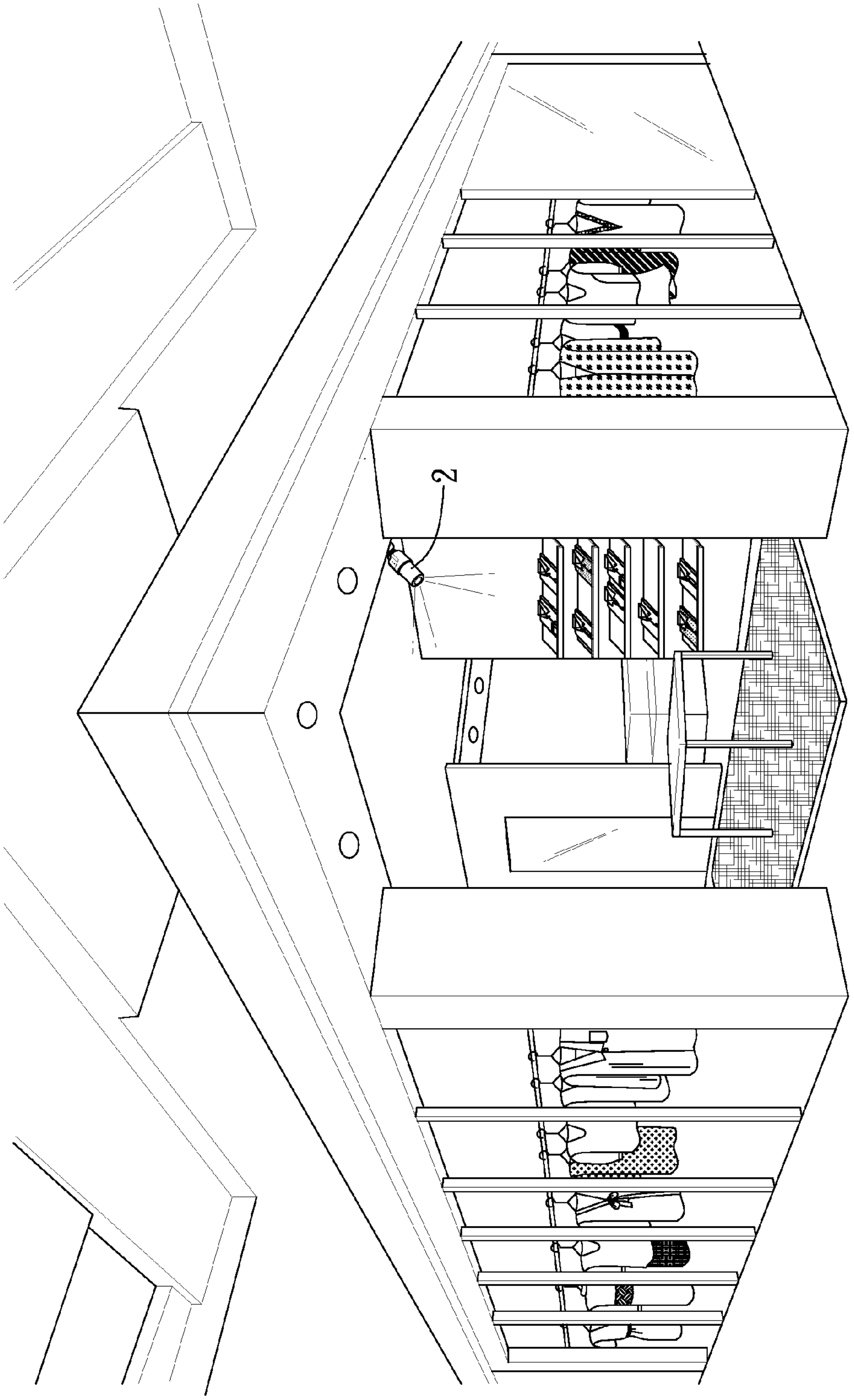
FIG. 5 is the third schematic view of the first embodiment of a monitoring camera in accordance with the present invention.

Please refer to FIG. 5. FIG. 5 is the third schematic view of the first embodiment of a monitoring camera in accordance with the present invention.

As shown in FIG. 5, the monitoring camera 2 in accordance with the present invention is installed in a department store to monitor the customers, the employees and the security of the area around it. As the glass cap of the monitoring camera 2 has the spherical protrusion part, the monitoring camera 2 has a wider view angle than the conventional monitoring camera; therefore, the monitoring range of the monitoring camera 2 is much greater than that of the conventional monitoring camera, such that the monitoring camera 2 can satisfy more different requirements and the application thereof can also be more flexible.

Figure 6:
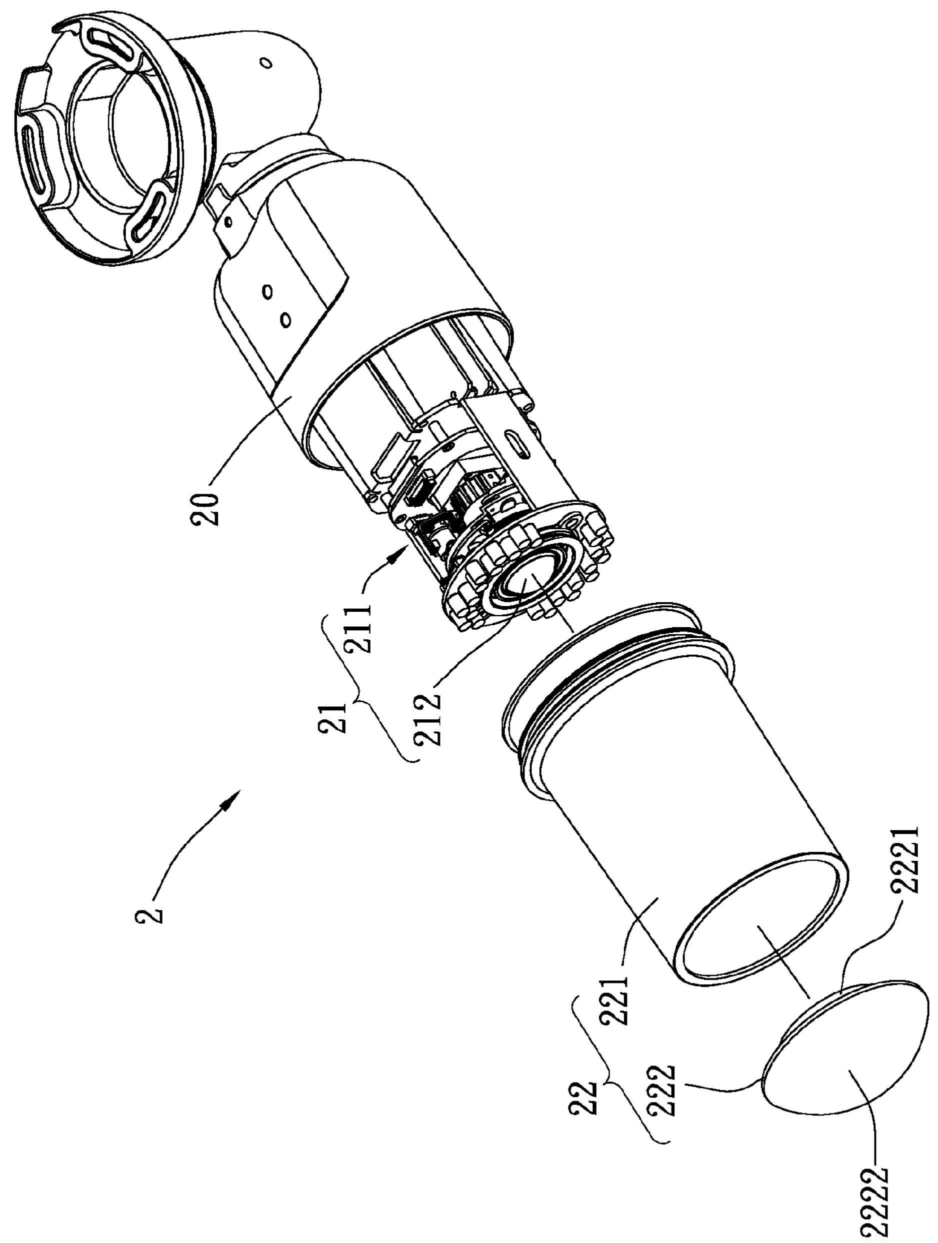
FIG. 6 is the schematic view of the second embodiment of a monitoring camera in accordance with the present invention.

With reference to FIG. 6 for the schematic view of the second embodiment of a monitoring camera in accordance with the present invention, the monitoring camera 2 comprises a main body 20, a lens module 21 and a camera lens front cover 22.

The lens module 21 is disposed on the main body 20, wherein the lens module 21 comprises a lens holder 211 and a camera lens 212. The camera lens 212 is disposed on the lens holder 211 and protrudes from the lens holder 211. The camera lens front cover 22 comprises a cylindrical casing 221 and a glass cap 222, wherein the cylindrical casing 221 is hollow and there are two openings at both sides of the cylindrical casing 221. The glass cap 222 is disposed on one of the opening of the cylindrical casing 221 and the space inside the glass cap 222 can be used to accommodate the lens module 21. In the embodiment, the cylindrical casing 221 is a hollow cylinder. One side of the glass cap 222 is disposed with a protrusion part 2222 and the other side of the glass cap 222 is disposed with a protrusion edge 2221, wherein the protrusion edge 2221 can be disposed at the position corresponding to the protrusion part 2222. The difference between the first embodiment and the second embodiment is that the diameter of the protrusion part 2222 of the second embodiment is equal to that of the glass cap 222, which can achieve a great effect, too.

The camera lens front cover 22 is disposed on the main body 20 and caps the lens module 21. The protrusion part 222 can accommodate the camera lens 212 protruding from the lens holder 211, such that the view angle of the camera lens 212 will not be blocked by the protrusion edge 2221 or other components of the glass cap 222.

Note that the above embodiments use the gun-shaped camera as an example instead of a limitation. The present invention can also be applied to various cameras in addition to the gun-shaped camera.

In summation of the description above, the present invention uses the protrusion part of the glass cap of the camera lens front cover to accommodate the camera lens to prevent the view angle of the camera lens from being blocked by the glass cap or other components; therefore, the present invention can effectively widen the view angle of the monitoring camera and greatly increase the application range of the monitoring camera. Also, the present invention only slightly change the structure of the camera lens front cover; hence, the present invention can effectively improve the problem that the view angle of the conventional monitoring camera is not wide enough without the need to significantly modify the structure of the monitoring camera and without additional cost. Moreover, the present invention can effectively broaden the view angle of the monitoring camera by a simple design; accordingly, the monitoring camera can satisfy more different requirements and the application thereof can be more flexible.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A camera lens front cover, comprising:

a cylindrical casing, for accommodating a lens module composed of a lens holder and a camera lens, wherein the cylindrical casing is hollow and there are two openings at both sides of the cylindrical casing, wherein the lens module is of a monitoring camera, and the monitoring camera is a gun-shaped camera; and a glass cap, disposed on one of the openings of the cylindrical casing, wherein one side of the glass cap is disposed with a protrusion part for accommodating the camera lens protruding from the lens holder.

2. The camera lens front cover of claim 1, wherein the protrusion part is circular, elliptical or polygonal.

3. The camera lens front cover of claim 1, wherein the protrusion part is a spherical surface.

4. The camera lens front cover of claim 3, wherein the cylindrical casing is a hollow cylinder.

5. The camera lens front cover of claim 4, wherein the glass cap further comprises a protrusion edge disposed on the other side of the glass cap.

6. A monitoring camera, comprising:

a main body;

a lens module, disposed on the main body, wherein the lens module comprises a lens holder and a camera lens, and the camera lens protrudes from the lens holder; and a camera lens front cover, comprising a cylindrical casing and a glass cap, wherein the cylindrical casing is hollow and there are two openings at both sides of the cylindrical casing; and the lens module is disposed inside the cylindrical casing; the glass cap is disposed on one of the openings of the cylindrical casing, and one side of the glass cap is disposed with a protrusion part for accommodating the camera lens protruding from the lens holder, wherein the monitoring camera is a gun-shaped camera.

7. The monitoring camera of claim 6, wherein the protrusion part is circular, elliptical or polygonal.

8. The monitoring camera of claim 6, wherein the protrusion part is a spherical surface.

9. The monitoring camera of claim 8, wherein the cylindrical casing is a hollow cylinder.

10. The monitoring camera of claim 9, wherein the glass cap further comprising a protrusion edge disposed on the other side of the glass cap.

11. The camera lens front cover of claim 1, wherein the cylindrical casing is disposed on a main body of the monitoring camera.

12. The monitoring camera of claim 6, wherein the cylindrical casing of the camera lens front cover is disposed on the main body of the monitoring camera.

* * * * *